United States Patent [19]

Engfer

[11] Patent Number: 5,267,782
[45] Date of Patent: Dec. 7, 1993

[54] HYDRAULIC BRAKE SYSTEM, IN PARTICULAR FOR MOTOR VEHICLES

[75] Inventor: Ortwin Engfer, Stuttgart, Fed. Rep. of Germany

[73] Assignee: Robert Bosch GmbH, Stuttgart, Fed. Rep. of Germany

[21] Appl. No.: 977,998

[22] Filed: Nov. 18, 1992

[30] Foreign Application Priority Data

Nov. 28, 1991 [DE] Fed. Rep. of Germany ....... 4139135

[51] Int. Cl.$^5$ .......................... B60T 8/26; B60T 8/32
[52] U.S. Cl. ...................... 303/92; 188/349;
303/9.63; 303/9.75; 303/116.1; 303/119.1;
303/115.5; 303/900
[58] Field of Search ............... 303/116.1, 900, 901,
303/92, 113.5, 9.62, 9.63, 9.75, 115.5, 115.4,
116.2, 116.3, 116.4, 117.1, 119.1, 119.2, 113.1,
113.2, 113.3; 188/349

[56] References Cited

U.S. PATENT DOCUMENTS

| | | | |
|---|---|---|---|
| 4,618,189 | 10/1986 | Nakanishi et al. | 303/115.4 |
| 4,647,114 | 3/1987 | Schuett et al. | |
| 4,703,979 | 11/1987 | Nakanishi et al. | 303/116.1 |
| 4,752,104 | 6/1988 | Miyake | 303/115.4 |
| 4,957,330 | 9/1990 | Morikawa et al. | 303/115.4 |
| 5,039,176 | 8/1991 | Hellmann et al. | 303/116.1 |
| 5,118,164 | 6/1992 | Rossigno et al. | 303/92 X |
| 5,127,713 | 7/1992 | Birkenbach | 303/113.5 X |
| 5,178,442 | 1/1993 | Toda et al. | 303/9.63 X |

FOREIGN PATENT DOCUMENTS

| | | | |
|---|---|---|---|
| 3419311 | 11/1985 | Fed. Rep. of Germany. | |
| 60-236859 | 11/1985 | Japan | 303/115.4 |
| 2199385 | 7/1988 | United Kingdom | 303/115.4 |

*Primary Examiner*—Douglas C. Butler
*Attorney, Agent, or Firm*—Edwin E. Greigg; Ronald E. Greigg

[57] ABSTRACT

A hydraulic brake system having an anti-skid system in which its rear axle brake circuit has a pressure control device switchable by a control pressure; if the anti-skid system should fail, this device reduces the brake pressure in the rear wheel brake cylinders. The hydraulic brake system includes the pressure control device which acts as a proportional pressure regulating valve and is switchable by a pressure prevailing on a master brake cylinder side of a return pump; if the anti-skid system should fail, this device reduces the pressure of the pressure fluid in the wheel brake cylinders by a fixed proportion compared with the pressure toward the master brake cylinder. The pressure control device has a very simple, compact design and is especially suitable for use in the rear axle brake circuit of a motor vehicle.

18 Claims, 2 Drawing Sheets

HYDRAULIC BRAKE SYSTEM, IN PARTICULAR FOR MOTOR VEHICLES

BACKGROUND OF THE INVENTION

The invention is based on a hydraulic anti-lock brake system especially for motor vehicles as set forth hereinafter. German Patent Application 34 19 311 A1 has already disclosed a hydraulic brake system with a pressure control device, provided in the rear axle brake circuit, that is switchable by impingement with a control pressure and that in the event the anti-skid system fails acts as a proportional pressure regulating valve and reduces the brake pressure in the rear wheel brake cylinders by a fixed ratio to the master brake cylinder pressure, so that locking of the rear wheels is prevented prior to locking of the front wheels of the vehicle. The known pressure control valve has the disadvantage of a very complicated and expensive design, with many components and a large structural size. The production cost of the pressure control device is also high. The control pressure generated by an auxiliary pressure source is switched by an electromagnetic control valve, which is very complicated and expensive. Moreover, it is possible that in the event of a malfunction of the control valve or auxiliary pressure source, even if the anti-skid system is intact, the brake pressure in the rear wheel brake cylinders may undesirably be decreased, since if the control pressure is absent, the pressure control device always acts as a proportional pressure regulating valve.

OBJECT AND SUMMARY OF THE INVENTION

The brake system according to the invention has an advantage over the prior art of being a very simple and compact structure of the pressure control device, which can easily be integrated into a so-called hydraulic unit of the anti-skid system of the brake system, for example. It is unnecessary to furnish a control pressure through a separately provided auxiliary pressure source having a control valve, so that the brake system can be produced at favorable cost. If the anti-skid system fails, the pressure control device acts as a proportional pressure regulating valve, which reduces the wheel brake cylinder pressure by a fixed proportion, dependent on the master brake cylinder pressure, compared with the master brake cylinder pressure. This kind of pressure control device can advantageously be assigned to a rear axle brake circuit, since if high brake pressures are employed in the event of failure of the anti-skid system, the pressure control device decreases the brake pressure in the wheel brake cylinders of the rear axle compared with the brake pressure in the wheel brake cylinders of the front axle and thus prevents locking of the rear wheels of the vehicle before the locking of the front wheels of the vehicle.

For an especially simple, compact design of the pressure control device it is advantageous if the housing component is provided with a continuous longitudinal bore in which the stepped valve member is disposed, if the valve member with its valve closing part cooperates with the valve seat that forms one end of the longitudinal bore of the housing component and widens frustoconically toward the upper face end of the housing component; a compression spring acting upon the valve element urges the valve closing element to lift away from its valve seat; a first operative face toward the wheel brake cylinder is provided on the valve element and a second operative face toward the master brake cylinder are provided, which are acted upon by the pressure fluid flowing through the pressure control device; and if the valve member is acted upon on a third operative face by the control pressure.

It is advantageous if the pressure control device is connected parallel to the inlet valve for the wheel brake cylinders, so that when the anti-skid system is intact, a majority of the pressure fluid flows through the pressure control device. A large flow cross section of the pressure control device makes it possible to embody the parallel inlet valve with a small flow cross section, assuring very good pressure modulation of the anti-skid system.

It is advantageous if the inlet valve is closed when without electrical current, assuring that in the event of failure of the anti-skid system, upon an actuation of the master brake cylinder, the pressure fluid will flow solely in the direction of the wheel brake cylinders, through the pressure control device which optionally decreases the wheel brake cylinder pressure of the pressure fluid.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
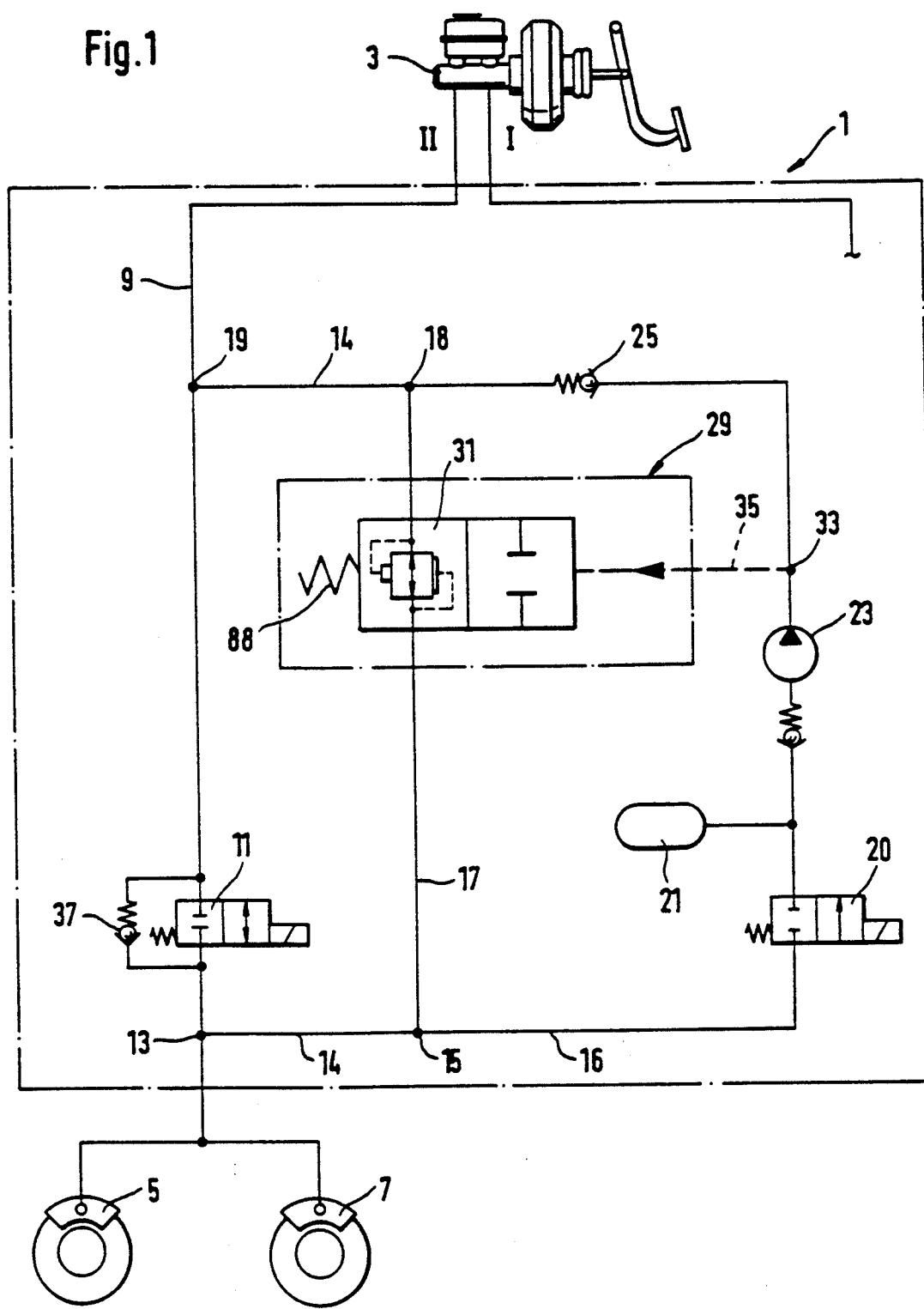
FIG. 1 shows a circuit diagram of a hydraulic brake system having a pressure control device, comprising a hydraulically switchable proportional; pressure regulating valve.

The hydraulic motor vehicle brake system 1 having an anti-skid system, shown by way of example in FIG. 1, has a pedal-actuatable master brake cylinder 3 to which two brake circuits I and II are connected. Brake circuit I, which acts upon the front wheel brakes of the vehicle, for instance, has been left out of FIG. 1; it may be embodied in a known manner.

Brake circuit II has a brake line 9 leading from the master brake cylinder 3 to brake cylinders 5 and 7 of rear wheel brakes of the vehicle. Disposed in the brake line 9 is an inlet valve 11 in the form of a 2/2-way magnet valve that is closed when without current and by means of which the brake pressure of the wheel brake cylinders 5 and 7 is controllable. Toward the wheel brake cylinder side of the inlet valve 11, a parallel line 14 branches off from the brake line 9 at a connection point 13. At a connection point 15, the parallel line 14 splits into a return line branch 16 and a pressure control line branch 17. Remote from the Wheel brake cylinders 5, 7, the return line branch 16 and the pressure control line branch 17 are joined together again at a connection point 18 to make the common parallel line 14.

The parallel line 14 communicates with the brake line 9, for instance at a connection point 19 between the master brake cylinder 3 and the inlet valve 11. Disposed in the return line branch 16, in the reverse flow direction toward the connection point 18, are successively an outlet valve 20, for instance in the form of a 2/2-way magnet valve that is closed when without electrical current and that enables the reduction of pressure in the wheel brake cylinders 5, 7; a storage chamber 21; and a return pump 23 preceded by a one-way valve that opens toward the return pump.

Upon actuation of the master brake cylinder 3, brake pressure can be generated in the wheel brake cylinders 5 and 7 by displacing quantities of pressure fluid through the brake line 9. In the pressure buildup phase, in which pressure is built up in the wheel brake cylinders, the inlet valve 11 is in the open position and the outlet valve 20 is in the fluid blocking position. If the danger of locking of at least one of the vehicle wheels threatens during braking, then the inlet valve 11 and the outlet valve 20 of the anti-skid system are triggered by an electronic control unit, not shown, by a known adaptive control algorithm, in such a way that a brake pressure modulation that is optimized for the braking conditions occurs in the wheel brake cylinders. For instance, if the pressure of the pressure fluid in the wheel brake systems 5, 7 is being reduced in order to prevent locking of the vehicle wheels, then the inlet valve 11 is closed and the outlet valve 20 is opened, so that the pressure fluid flows into the storage chamber 21 and a rapid pressure reduction in the wheel brake cylinders 5, 7 occurs. In this pressure reduction phase, the inlet valve 11 is accordingly in the fluid blocking position and the outlet valve 20 is in the fluid flow open position. During the entire anti-skid function, the return pump 23 is switched on and pumps the pressure fluid out of the reservoir chamber 21, disposed on the intake side of the return pump 23, into the brake line 9 on the pressure side, for instance via the parallel line 14, at the connection point 19. A spring-loaded one-way check valve 25 disposed on the pressure side of the return pump 23 prevents a return flow of the pressure fluid from the master brake cylinder side through the return line branch 16 to the return pump 23 counter to the return direction. In a pressure holding phase, in which the pressure of the pressure fluid in the wheel brake cylinder 5, 7 is to be kept constant, both the inlet valve 11 and the outlet valve 20 are switched into the fluid flow blocking position. A pressure control device 29, by which the pressure of the pressure fluid, such as a commercially available brake fluid, in the wheel brake cylinders 5, 7 can be varied, is disposed in the pressure control line branch 17, for instance between the connection point 15 and the connection point 18. The pressure control device 29 consists of a proportional pressure regulating valve 31, which can be closed off to fluid flow by means of a control pressure that is furnished, via a control pressure line 35 that branches off at a connection point 33 of line 16, by the pressure prevailing in line 16 on the master brake cylinder side of the return pump 23. The proportional pressure regulating valve 31 functions such that the pressure fluid on the side toward the wheel brake cylinder is reduced, compared with the pressure toward the master brake cylinder, by a fixed proportion, which is dependent on the pressure toward the master brake cylinder.

The object of the pressure control device 29 is to avert locking of the rear wheels prior to the locking of the front wheels of the vehicle if the anti-skid system should fail, by reducing the pressure of the pressure fluid in the wheel brake cylinders 5, 7.

In the normal situation, or in other words when the anti-skid system is intact, both the pressure control device 29 and the inlet valve 11 disposed parallel to the pressure control device are in the open position upon initiation of braking by actuation of the master brake cylinder 3. If the anti-skid system goes into operation, then the pressure in the wheel brake cylinders 5, 7 is modulated via the inlet valve 11 and the outlet valve 20, and the return pump 23 starts up. The pressure of the return pump 23 toward the master brake cylinder serves as a control pressure for the pressure control device 29 and interrupts the flow of pressure fluid through the pressure control device 29.

In a departure from the hydraulic circuit diagram of the vehicle brake system 1 shown in FIG. 1, however, it is also possible to provide an individual inlet valve 11 per wheel brake cylinder. In that case, the motor vehicle brake system 1 can advantageously have an individual pressure control device 29 for each wheel brake cylinder 5, 7.

If the anti-skid system of the hydraulic brake system 1 should fail, then the pressure control device 29 serves to prevent premature locking of the rear wheels prior to locking of the front wheels of the vehicle, and thus to maintain the stability of the vehicle even during braking. To that end, if the anti-skid system should fail, the supply of electrical current to the inlet valve 11 and the outlet valve 20 is interrupted, which are both closed when without current, thereby bringing about their spring-actuated blocking positions. If the master brake cylinder 3 is actuated, then quantities of pressure fluid are displaced through the brake line 9 connection 19 lines 14 and 17 into the pressure control device 29 acting as a proportional pressure regulating valve 31 toward the wheel brake cylinders. If the pressure of the pressure fluid on the master brake cylinder side exceeds a characteristic, preset pressure of the regulating valve 31, then the pressure toward the wheel brake cylinder is decreased, compared with the pressure toward the master brake cylinder, by a fixed proportion dependent both on the master brake cylinder pressure and on the design of the proportional pressure regulating valve 31. The proportional pressure regulating valve 31 is also known as a brake pressure reducer or pressure reducing valve.

A spring-loaded one-way check valve 37 is disposed parallel to the inlet valve 11 and permits a return flow of pressure fluid from the wheel brake cylinders 5, 7 in the direction of the master brake cylinder 3. The check valve 37 enables a pressure reduction in the wheel brake cylinders 5, 7 and thus a release of the rear wheel brakes of the vehicle when the inlet valve 11 is closed.

Figure 2:
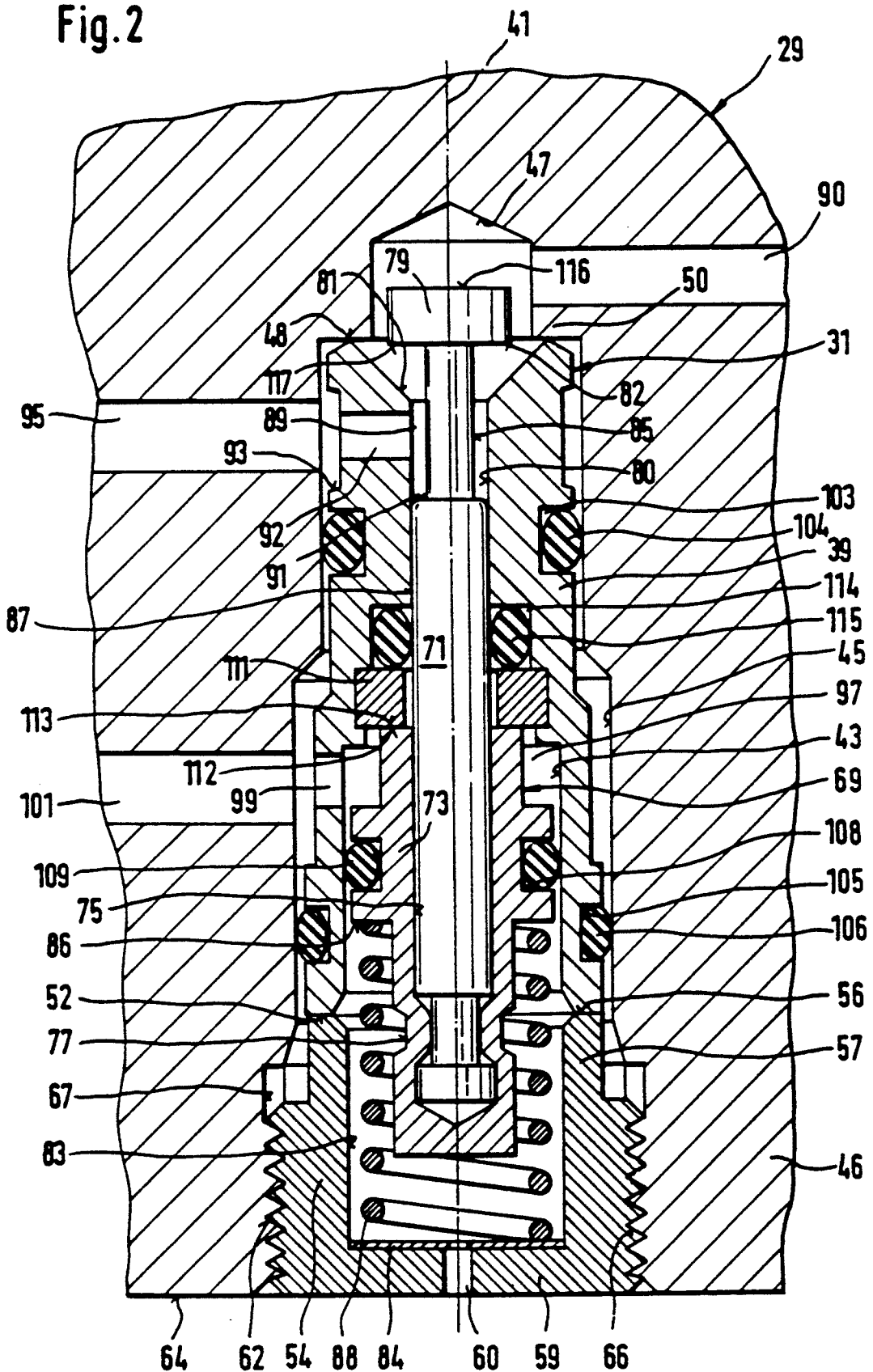
FIG. 2 shows a first exemplary embodiment of such a pressure control device according to the invention.

FIG. 2 shows an exemplary embodiment of the pressure control device 29, which is embodied as a hydraulically closeable pressure regulating valve 31. The proportional pressure regulating valve 31 is also known as a brake pressure reducer or pressure reducer valve. The pressure control device 29 has an elongated tubular housing component 39, which has a stepped longitudinal bore 43 concentric with a longitudinal valve axis 41. The housing component 39 is disposed in a blind-bore-like receiving bore 45 of a housing block 46, for instance, of a hydraulic unit and rests with an upper face end 48, oriented toward a bottom 47 of the blind-bore-like receiving bore 45, on a bearing shoulder 50 of the stepped receiving bore 45. A cup-shaped housing cap 54 rests with an upper face end 56 of a jacket part 57 on a lower face end 52 of the housing component 39, remote from the upper face end 48. Remote from the upper face end 56, the housing cap 54 has a bottom part 59, in which a vent opening 60 is formed, for instance concentrically with the longitudinal valve axis 41. On the circumference of its jacket part 57, the housing cap 54 has a male thread 62, with which the housing cap 54 is screwed into a threaded segment 67 of the receiving bore 45 that begins at a lower face end 64 of the housing block 46 and has a female thread 66. A stepped valve member 69 is disposed in the stepped longitudinal bore 43 of the housing component 39. The valve member 69 is formed, for instance, by an elongated, stepped valve tappet 71 oriented toward the bottom 47 and a stepped valve piston 73 oriented toward the lower face end 64, and a blind bore 75 extends concentrically with the longitudinal valve axis 41 inside the valve piston 73. In the direction remote from the bottom 47 of the blind-bore-like receiving bore 47, the valve tappet 71 protrudes by one of its ends into the blind bore 75, and near its closed end it is joined to the valve piston 73, for instance by a crimped connection 77. The valve member 69 may, however, also be made from a single workpiece.

On its free end remote from the valve piston 73, the valve tappet 71 has a valve closing element 79, for instance of cylindrical shape, with an enlarged diameter. Beginning at the upper face end 48 of the housing component 39, the stepped longitudinal bore 43 of the housing component has a segment that tapers frustoconically toward the valve piston 73 and forms the valve seat 81. With its closing edge 82, formed on its circumference and oriented toward the valve seat 81, the valve closing element 79 cooperates with the valve seat 81 and with it forms a seat valve.

Immediately adjoining the valve seat 81 in the direction toward the valve piston 73, the longitudinal bore 43 of the housing component 39 has a cylindrical guide segment 80. Bordering the valve closing element 79, toward the valve piston 73, the valve tappet 71 has a flow region 85, which has a markedly smaller diameter than the wall of the cylindrical guide segment 80. The guide segment 80 serves to guide the valve member 69 in a cylindrical guide region 87 of the valve tappet 71 that adjoins the flow region 85.

An annular cross section 89 is formed between the circumference of the flow region 85 of the valve tappet 71 and the wall of the guide segment 80 of the housing component 39.

The cup-shaped housing cap 54 has a blind bore 83, defined by the wall of the jacket part 57 and by the bottom part 59; a support disk 84 resting on the bottom part 59 is disposed in the blind bore 83, and the valve member 69 protrudes with its end remote from the valve 81 into this bore 83. A compression spring 88 rests on a radially outwardly pointing bearing shoulder 86 of the valve piston 73 oriented toward the support disk 84 and is supported on its other end on the support disk 84. The compression spring 88 urges the valve member 69 to move in the direction of the bottom 47 of the blind-bore-like receiving bore 45 and thus tends to lift the valve closing element 79 of the valve member 69 away from the valve seat 81 and thus keeps the seat valve in the open position.

An outlet conduit 90 is embodied in the housing block 46, for instance extending at right angles to the longitudinal valve axis 41; by way of example, it begins at the receiving bore 45 at an axial level between the bottom 47 and the bearing shoulder 50. The outlet conduit 90 forms a segment toward the wheel brake cylinders 5 and 7 of the brake line 9 and permits a flow of pressure fluid toward the wheel brake cylinders 5, 7.

At the axial level near the valve seat 81, a first through opening 92 is formed in the guide segment 80 of the housing component 39, passing through the wall of the housing component, and extending at right angles to the longitudinal valve axis 41 by way of example; this opening 92 begins at an annular groove 93 that in this region extends along the circumference of the housing block 39. At approximately the same axial level, the housing block 46 has an inlet conduit 95, for instance extending at right angles to the longitudinal valve axis 41; this conduit represents a segment toward the master brake cylinder of the brake line 9 and enables a flow of pressure fluid from the master brake cylinder 3 into the pressure conduit device 29.

An annular chamber 97 is formed between the circumference of the vertical piston 73 of the valve member 69 and the wall of the longitudinal bore 43 of the housing component 39, at an axial level between the first through opening 92 and the lower face end 52 of the housing component 39. A second through opening 99 is provided in the housing component 39 at the axial level of the annular chamber 97 and passes through the wall of the housing component and by way of example extends at right angles to the longitudinal valve axis 41. The housing block 46 has a control conduit 101, which for instance extends at right angles to the longitudinal valve axis 41, and which forms a segment of the control pressure line 35 and provides communication for the pressure fluid, at control pressure, from the return pump 23 to the annular chamber 97.

A first upper annular groove 103 is formed on the circumference of the housing component 39, in which a first upper sealing ring 104 is disposed axially between the annular groove 93 and the second through opening 99. A first lower annular groove 105 is provided on the circumference of the housing component, which serves to receive a first lower sealing ring 106 at an axial level between the second through opening 99 and the lower face end 52 of the housing component 39. The first upper sealing ring 104 and the first lower sealing ring 106 rest tightly against the wall of the receiving bore 45 of the housing block 46.

The valve piston 73 of the valve member 69 has a second lower annular groove 108 on its circumference between the annular chamber 97 and the bearing shoulder 86; a second lower sealing ring 109 resting on the wall of the longitudinal bore 43 of the housing component 39 is disposed in the annular groove 108.

A stop ring 111 is secured in the longitudinal bore 43 of the housing component 39, for instance by press-fitting, at an axial level between the first through opening 92 and the second through opening 99. With a lower stop face end 112 oriented toward the compression spring 88, the stop ring 111 serves to limit the stroke of the valve member 69 in the direction remote from the compression spring 88, which occurs when the valve piston 73, with an upper face end 113 oriented toward the valve seat 81, strikes the stop face end 112 of the stop ring 111.

A second upper annular groove 114 is embodied in the wall of the longitudinal bore 43 of the housing component 39, in which a second upper sealing ring 115 resting on the circumference of the valve tappet 71 of the valve member 69 is disposed bordering the stop ring 111 in the direction toward the valve seat 81.

The mode of operation of the pressure control device 29 will now be described, referring to FIG. 2. If the anti-skid system of the brake system 1 is intact, or in other words in the normal situation, the inlet valve 11 has electrical current as long as the anti-skid system is not in operation, and therefore this valve is in the open position, and the pressure control device 29 disposed parallel to the inlet valve in the pressure control line branch 17 is opened. In the pressure control device 29, the valve piston 73 of the valve member 69 is pressed against the stop ring 111 by the force of the compression spring 88, so that the seat valve, formed by the valve seat 81 and the valve closing element 79, is completely opened, and an unreduced flow is possible for the pressure fluid from the inlet conduit 95 toward the master brake cylinder to the outlet conduit 90 toward the wheel brake cylinder; in other words, the pressure of the pressure fluid in the pressure control device 29 is of equal magnitude throughout. A first operative face toward the wheel brake cylinder is formed on an upper face end 116 of the valve closing element 79 oriented toward the bottom 47 of the receiving bore 45 and is defined radially only by the circumference of the valve closing element. In the opposite direction, an annular valve face 117 that extends vertically to the longitudinal valve axis 41 is formed on the valve closing element 79 of the valve member 69, forming a transition between the flow region 85 of the valve tappet 71 and the valve closing element 79. In the direction toward the valve piston 73, the valve tappet 71 has an annular transition face 91 extending at right angles to the longitudinal valve axis 41, between the flow region 85 of the valve tappet and its guide region 87. A second operative face toward the master brake cylinder is formed by the difference in cross sections between the larger valve face 117 and the smaller transitional face 91 on the valve face 117 of the valve closing element 79. Accordingly, the second operative face toward the master brake cylinder is defined radially inwardly by the diameter of the guide region 87 and radially outwardly by the circumference of the valve closing element 79 of the valve tappet 81, and oriented counter to the first operative face toward the wheel brake cylinder.

If the pressure of the pressure fluid in the pressure buildup phase is increased, then if a characteristic pressure of the pressure fluid, specified by the force of the pressure spring 88, is exceeded, the free flow cross section at the valve seat 81 is decreased, because the pressure of the pressure fluid engaging the first operative face of the valve closing member urges the valve closing element 79 of the valve closing member 69 toward the valve seat 81, counter to both the force of the compression spring 88 and to the pressure of the pressure fluid acting in the opposite direction upon the second operative face of the valve closing element 79. If the inlet pressure of the pressure fluid toward the master brake cylinder is then increased still further, then the outlet pressure of the pressure control device 29 toward the wheel brake cylinder rises to a lesser extent than the inlet pressure toward the master brake cylinder, because of the reduced flow cross section of the valve seat 81; the pressure control device 29 accordingly acts as a proportional pressure regulating valve 31.

If the anti-skid system comes into operation, which upon braking modulates the pressure of the pressure fluid in the wheel brake cylinders 5, 7 via the inlet valve 11 and the outlet valve 20, then the return pump 23 starts up and, with the inlet valve 11 closed, pumps the pressure fluid out of the wheel brake cylinders 5, 7 through the opened outlet valve 20 and the return line branch 16 toward the master brake cylinder 3. Via the control pressure line 35 and the control conduit 101, the valve piston 73 of the valve member 69 is acted upon by the pressure of the pressure fluid prevailing on the master brake cylinder side of the return pump 23 and serving as control pressure for the pressure conduit device 29. In the direction remote from the annular chamber 97 in the valve seat 81, the control pressure acts upon a third operative face of the valve piston 73, which is oriented toward the valve seat and is defined radially inwardly by the blind bore 75 and radially outwardly by the circumference of the valve piston 73 or of the second lower sealing ring 109; if the control pressure is adequately high, this third operative face moves the valve member 69 toward the bottom part 59 of the housing cap 54, counter to the force of the compression spring 88, and thus moves the valve closing element 79 of the valve closing member 69 toward the valve seat 81, thereby blocking the passage of the pressure fluid at the valve seat 81. In this way, when the anti-skid system is in operation, a flow of the pressure fluid through the pressure control device 29 is prevented.

If the anti-skid system is defective in some way, the power supply to the inlet valve 11, outlet valve 20 and return pump 23 is interrupted, so that the inlet valve 11 and the outlet valve 20 are in the blocking position. The force of the compression spring 88 assures that the pressure control device 29 is in the open position, so that the valve closing element 79 is raised all the way up from the valve seat 81, and the valve piston 73 rests on the stop ring 111. The pressure of the pressure fluid is then of equal magnitude at every point of the pressure control device 29, and thus the outlet pressure toward the wheel brake cylinder matches the inlet pressure toward the master brake cylinder of the pressure control device 29. If the master brake cylinder 3 is then actuated upon braking, a quantity of pressure fluid is displaced through the brake line 9, the parallel line 14, the pressure control line branch 17 and the inlet conduit 95 into the pressure control device 29. The pressure fluid flows past the valve seat 81 of the open seat valve, through the outlet conduit 90, toward the wheel brake cylinders 5, 7. The outlet pressure of the pressure control device toward the wheel brake cylinder initially increases to the same extent as the inlet pressure toward the master brake cylinder. In the direction remote from the valve seat 81, the pressure fluid acts upon the second operative face, toward the master brake cylinder, of the valve closing element 79 of the valve member 69 and thus brings about a pressure force toward the master brake cylinder that urges the valve closing element 79 to lift from the valve seat 81 and thus acts in the same direction as the force of the compression spring 88.

Directed counter to the pressure force toward the master brake cylinder and the spring force of the compression spring 88, the pressure of the pressure fluid acting upon the first operative face toward the wheel brake cylinder effects a pressure force toward the wheel brake cylinder that urges the valve closing element 79 of the valve member 69 to move in the direction of the valve seat 81 of the seat valve and thus causes the free opening cross section of the seat valve to become smaller.

If the pressure of the pressure fluid toward the master brake cylinder rises above a characteristic, preset value that is predetermined by the spring force of the compression spring and by the size of the operative faces and represents the onset of regulation, then the pressure force of the pressure fluid toward the wheel brake cylinder is greater than the sum of the pressure force toward the master brake cylinder and the spring force of the compression spring 88. The compression spring 88 is compressed by the valve piston 73, and the valve closing element 79 moves toward the valve seat 81, reducing the free flow cross section at the valve seat 81. If there is a further increase in the inlet pressure toward the master brake cylinder, the outlet pressure of the pressure control device 29 toward the wheel brake cylinder rises then only to a reduced extent, because of the reduced flow cross section. This results in a pressure of the pressure fluid upon the wheel brake cylinder side of the pressure control device that is reduced compared with the pressure toward the master brake cylinder, or in other words leads to a pressure reduction. The operative faces of the valve member 69 that are acted upon by the pressure of the pressure fluid and the valve closing element 79 of the valve member 69 cooperating with the valve seat 81 form the proportional pressure regulating valve 31, which reduces the pressure toward the wheel brake cylinder, compared with the pressure toward the master brake cylinder, by a fixed proportion that is dependent on the pressure toward the master brake cylinder. The proportional pressure regulating valve 31 is also called a pressure reducer valve or a brake pressure reducer.

If the pressure of the pressure fluid toward the master brake cylinder is lowered, to enable releasing the wheel brakes and reducing pressure in the wheel brake cylinders 5, 7, then the pressure fluid can flow out of the wheel brake cylinders 5, 7 in the direction of the master brake cylinder 3 via the spring-loaded check valve 37 disposed parallel to the inlet valve 11, overcoming the spring force in so doing. This assures a reliable and safe pressure reduction in the wheel brake cylinders 5, 7.

As a function of the pressure of the pressure fluid both toward the wheel brake cylinder and toward the master brake cylinder and of the size of the operative faces and spring force of the compression spring 88, the pressure fluid can also flow back through the pressure control device 29 from the wheel brake cylinders 5, 7 toward the master brake cylinder 3.

The pressure control device 29, which has the function of a proportional pressure regulating valve 31 that can be switched by means of a control pressure, has a very simple and compact design and can be manufactured simply and economically. The pressure prevailing on the master brake cylinder side of a return pump 23 disposed in the return line branch 16 serves as the control pressure.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A hydraulic brake system having an anti-skid system for motor vehicles, having a master brake cylinder (3), a first brake line (9) that carries brake pressure fluid and extends between said master brake cylinder and at least one wheel brake cylinder, an inlet valve (11) disposed in the first brake line, between said master brake cylinder and said at least one wheel cylinder, said inlet valve in its basic position is closed and in case of faultless state of said anti-skid system is opened to connect said master brake cylinder to the at least one wheel brake during normal braking operation and is alternatively closed and opened for an anti-skid operation, a fluid return line (14) connected to said first brake line between said inlet valve and said at least one brake cylinder and extending in parallel with said first brake line, an outlet valve (20) in a return branch line (16) joined to said fluid return line (14), said outlet valve in its basic position is closed for normal braking operation and is alternatively opened and closed during an anti-skid operation for lowering wheel brake cylinder pressures and a return pump (23) disposed in said fluid return line, and a pressure control device is disposed in a pressure control line branch (17) between the master brake cylinder and the wheel brake cylinder, said pressure control device is in action upon failure of the anti-skid system and is switched to a closed position by an imposition of a control pressure produced by said return pump during anti-skid operation, the pressure control device includes a housing block having a stepped valve member cooperating with a valve seat (81) and acting as a proportional pressure regulating valve of a hydraulic unit that reduces the brake fluid pressure toward the wheel brake cylinder by a fixed proportion dependent on a pressure toward the master brake cylinder, and the brake fluid pressure prevailing on a master brake cylinder side of the return pump (23) disposed in the return line branch (16) serves as said control pressure for the pressure control device (29) upon operation of the anti-skid system switching said pressure control valve to be closed.

2. A hydraulic brake system as defined by claim 1, in which said pressure control device includes a housing component (39) with an elongated stepped longitudinal bore, a stepped valve member (69) is disposed in said stepped longitudinal bore and includes a valve closing element (79) which cooperates with the valve seat (81) formed by one end of the stepped longitudinal bore (43) of the housing component (39), said valve seat widens frustoconically toward an upper face end (48) of the housing component (39); a compression spring (88) acts upon the stepped valve member (69) to urge the valve closing element (79) to lift from its valve seat (81); said stepped valve member is provided with a first operative face toward the at least one wheel brake cylinder and a second operative face toward the master brake cylinder, said first and second operative faces are acted upon by a pressure fluid flowing through the pressure control device 929); and the stepped valve member (69) is acted upon by a control pressure of said return pump on a third operative face.

3. A hydraulic brake system as defined by claim 1, in which the pressure control device (29) is disposed parallel to the inlet valve (11) for the at least one wheel brake cylinder (5, 7).

4. A hydraulic brake system as defined by claim 2, in which the pressure control device (29) is disposed parallel to the inlet valve (11) for the at least one wheel brake cylinder (5, 7).

5. A hydraulic brake system as defined by claim 1, in which the control pressure engages the stepped valve member (69) in such a way that a pressure force counter to a spring force of a compression spring (88) in said pressure control device is generated in a closing direction of the pressure control device.

6. A hydraulic brake system as defined by claim 2, in which the control pressure engages the stepped valve member (69) in such a way that a pressure force counter to a spring force of a compression spring (88) in said pressure control device is generated in a closing direction of the pressure control device.

7. A hydraulic brake system as defined by claim 1, in which the stepped valve member (69) is formed of a valve tappet (71) and a valve piston (73).

8. A hydraulic brake system as defined by claim 2, in which the stepped valve member (69) is formed of a valve tappet (71) and a valve piston (73).

9. A hydraulic brake system as defined by claim 7, in which the valve tappet (71) protrudes by one end into a blind bore (75) of the valve piston (73) and is fixed on said valve piston.

10. A hydraulic brake system as defined by claim 8, in which the valve tappet (71) protrudes by one end into a blind bore (75) of the valve piston (73) and is fixed on said valve piston.

11. A hydraulic brake system as defined by claim 7, in which the valve tappet (71) is joined to the valve piston (73) by means of a crimped connection (77).

12. A hydraulic brake system as defined by claim 8, in which the valve tappet (71) is joined to the valve piston (73) by means of a crimped connection (77).

13. A hydraulic brake system as defined by claim 9, in which the valve tappet (71) is joined to the valve piston (73) by means of a crimped connection (77).

14. A hydraulic brake system as defined by claim 10, in which the valve tappet (71) is joined to the valve piston (73) by means of a crimped connection (77).

15. A hydraulic brake system as defined by claim 1, in which the inlet valve (11) is closed to prevent fluid flow when without an applied electrical current.

16. A hydraulic brake system as defined by claim 1, in which the pressure control device (29) is disposed in a receiving bore (45) of a housing block (46) of a hydraulic unit.

17. A hydraulic brake system as defined by claim 1, in which said outlet valve is closed to prevent fluid flow when without an applied electrical current.

18. A hydraulic brake system as defined by claim 15, in which said outlet valve is closed to prevent fluid flow when without an applied electrical current.

* * * * *